(12) United States Patent
Waldman et al.

(10) Patent No.: US 9,037,974 B2
(45) Date of Patent: May 19, 2015

(54) CREATING AND EDITING DYNAMIC GRAPHICS VIA A WEB INTERFACE

(75) Inventors: Lawrence Waldman, Bellevue, WA (US); Thomas Charles Underhill, Seattle, WA (US); Scott Harrison Douglas, Seattle, WA (US); Robert Emmett Kolba, Jr., Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1173 days.

(21) Appl. No.: 11/965,774

(22) Filed: Dec. 28, 2007

(65) Prior Publication Data

US 2009/0172559 A1    Jul. 2, 2009

(51) Int. Cl.
| | | |
|---|---|---|
| G06F 3/00 | (2006.01) | |
| G06F 17/21 | (2006.01) | |
| G06F 17/24 | (2006.01) | |
| G06F 17/30 | (2006.01) | |
| G06F 3/0481 | (2013.01) | |
| G11B 27/00 | (2006.01) | |

(52) U.S. Cl.
CPC ............. *G06F 17/211* (2013.01); *G06F 17/24* (2013.01); *G06F 17/30017* (2013.01); *G06F 17/212* (2013.01); *G06F 3/0481* (2013.01); *G11B 27/00* (2013.01); *G06F 17/30867* (2013.01)

(58) Field of Classification Search
CPC ..... G06F 3/0481; G06F 17/211; G06F 17/24; G06F 17/212; G06F 17/30017; G11B 27/00
USPC .......................... 715/744, 731, 730, 732, 747
See application file for complete search history.

(56) References Cited

U.S. PATENT DOCUMENTS

| | | | | |
|---|---|---|---|---|
| 5,555,369 | A | * | 9/1996 | Menendez et al. ............ 715/762 |
| 5,835,919 | A | * | 11/1998 | Stern et al. ..................... 715/209 |
| 6,098,092 | A | * | 8/2000 | Padzensky .................... 709/203 |
| 6,243,761 | B1 | * | 6/2001 | Mogul et al. .................. 709/246 |
| 6,320,600 | B1 | | 11/2001 | Smith et al. |
| 6,614,433 | B1 | * | 9/2003 | Watts ............................ 345/440 |

(Continued)

FOREIGN PATENT DOCUMENTS

| | | |
|---|---|---|
| AU | WO0112444 A1 | 2/2001 |
| JP | 2011-508344 A | 3/2011 |

(Continued)

OTHER PUBLICATIONS

International Search Report dated May 27, 2009 in International Application No. PCT/US2008/085054.

(Continued)

*Primary Examiner* — Patrick Riegler
(74) *Attorney, Agent, or Firm* — Steve Crocker; Jim Ross; Micky Minhas

(57) ABSTRACT

Technologies are described herein for creating and editing dynamic graphics via a World Wide Web ("Web") interface. A Web service is provided for generating dynamic graphics in response to requests received from client computers. In response to requests from client computers, the Web service generates requested dynamic graphics and returns the generated dynamic graphics to the client computers in response to the requests. Parameters may be provided to the Web service indicating a list of text items, a layout type, a visual style, a color, and other aspects of a dynamic graphic. A user interface is also provided for creating and editing a dynamic graphic within a Web browser application.

20 Claims, 12 Drawing Sheets

(56) References Cited

U.S. PATENT DOCUMENTS

| | | | |
|---|---|---|---|
| 6,760,043 | B2 | 7/2004 | Markel |
| 6,826,727 | B1* | 11/2004 | Mohr et al. ............... 715/235 |
| 6,922,200 | B1* | 7/2005 | Marques ................... 345/619 |
| 6,973,618 | B2 | 12/2005 | Shaughnessy et al. |
| 7,050,079 | B1* | 5/2006 | Estrada et al. ............. 715/760 |
| 7,277,925 | B2 | 10/2007 | Warnock |
| 7,747,946 | B2* | 6/2010 | Nelson et al. .............. 715/243 |
| 7,844,966 | B1* | 11/2010 | Chan ......................... 718/101 |
| 2001/0048436 | A1* | 12/2001 | Sanger ....................... 345/467 |
| 2002/0091582 | A1* | 7/2002 | Palmer et al. ................. 705/26 |
| 2003/0159128 | A1* | 8/2003 | Kunzler ..................... 717/109 |
| 2004/0003121 | A1 | 1/2004 | Tanimoto |
| 2004/0041818 | A1* | 3/2004 | White et al. ............... 345/619 |
| 2004/0070609 | A1* | 4/2004 | Estrada ...................... 345/751 |
| 2004/0085330 | A1* | 5/2004 | Walker et al. ............. 345/630 |
| 2004/0114813 | A1* | 6/2004 | Boliek et al. .............. 382/233 |
| 2004/0243930 | A1* | 12/2004 | Schowtka et al. .......... 715/513 |
| 2004/0250205 | A1 | 12/2004 | Conning |
| 2005/0007382 | A1* | 1/2005 | Schowtka ................... 345/619 |
| 2005/0091571 | A1* | 4/2005 | Leichtling ................. 715/500 |
| 2005/0122342 | A1* | 6/2005 | Miyamoto et al. ......... 345/589 |
| 2005/0122344 | A1* | 6/2005 | Theimer et al. ............ 345/629 |
| 2005/0138570 | A1* | 6/2005 | Good et al. ................ 715/789 |
| 2005/0216431 | A1* | 9/2005 | Baker et al. ................... 707/1 |
| 2005/0231525 | A1* | 10/2005 | Habuta et al. .............. 345/591 |
| 2005/0262437 | A1 | 11/2005 | Patterson et al. |
| 2005/0276577 | A1* | 12/2005 | Yoda et al. ................... 386/95 |
| 2006/0070005 | A1* | 3/2006 | Gilbert et al. .............. 715/763 |
| 2006/0114505 | A1 | 6/2006 | Fitzpatrick et al. |
| 2006/0129933 | A1* | 6/2006 | Land et al. ................. 715/723 |
| 2006/0140513 | A1* | 6/2006 | Tran Xuan et al. ......... 382/305 |
| 2006/0192880 | A1* | 8/2006 | Takahira et al. ........ 348/333.05 |
| 2006/0209093 | A1 | 9/2006 | Berker et al. |
| 2006/0230342 | A1* | 10/2006 | Nelson et al. .............. 715/517 |
| 2006/0244765 | A1* | 11/2006 | Isomura et al. ............. 345/635 |
| 2006/0263133 | A1 | 11/2006 | Engle et al. |
| 2007/0055939 | A1* | 3/2007 | Furlong et al. ............. 715/731 |
| 2007/0094597 | A1 | 4/2007 | Rostom |
| 2007/0115300 | A1* | 5/2007 | Barney et al. .............. 345/619 |
| 2007/0156433 | A1* | 7/2007 | Thorson et al. ................ 705/1 |
| 2008/0065977 | A1* | 3/2008 | Gottlieb et al. ............. 715/203 |
| 2008/0163069 | A1* | 7/2008 | Eilers ......................... 715/744 |
| 2008/0184143 | A1* | 7/2008 | Gottlieb et al. ............. 715/764 |
| 2008/0244376 | A1* | 10/2008 | Gottlieb et al. ............. 715/211 |

FOREIGN PATENT DOCUMENTS

| | | |
|---|---|---|
| KR | 100560302 | 3/2006 |
| WO | WO02069541 A2 | 9/2002 |
| WO | WO2007112447 A2 | 10/2007 |
| WO | 2009085526 A1 | 7/2009 |

OTHER PUBLICATIONS

"The Web Based Graphics Editor", 2006, Ajax13, p. 1.
"Depicter", retrieved on Oct. 24, 2007 at <<http://www.depicter.com/>>, p. 1.
"About ZCubes", 1996-2007, ZCubes Inc., pp. 1-6.
"Draw4free", retrieved on Oct. 24, 2007 at <<http://www.draw4free.com/aboutPage.htm>>, p. 1.
Chinese Notice on the First Office Action mailed Apr. 23, 2012, in Application No. 200880123232.9 (8 pages).
Chinese Notice on the Second Office Action mailed Dec. 24, 2012, in Application No. 200880123232.9 (14 pages).
Hokugou, Tatsurou, "Start of 'Integration Period' of WWW and Desktop; Heating up of Future Generation Platform Battle for Implementation of WaaC," Nikkei Electronics, No. 953, pp. 85-92, Nikkei Business Publications, Inc., Japan, Jun. 4, 2007.
Seeing is Believing; Leading you to Unknown Newest Site; Experience Web 2.0!; Chapter 3, Fellows are Present Even in the Opposite Side of the Earth, Nikkei Personal Computing, No. 518, pp. 62-67, Nikkei Business Publications, Inc., Japan, Nov. 27, 2006.
Kajihara, Kiroo, "Contemporary Arrangement of Health Concept; Presentations (3) by using Power Pint,": Medical Care & Computer, vol. 11, No. 1, pp. 55-58, Electronic Publishing Company Japan, Japan, Jan. 20, 2000.
Ishikawa, Michitomo, "Office X Gallon Hat; Shadow Leading Player of Office Series!? Fully Using Power Point (1) 18," Mac People, vol. 8, No. 21, pp. 148-149, ASCII Corporation, Japan, Nov. 1, 2002.
Mizuno, Takaaki, "Part 4 Web 2.0 System SaaS [office application version] Checking Usability of [office SaaS]," Computerworld Get Technology Right, vol. 3, No. 10, pp. 78-84, IDG Japan, Inc. Japan, Oct. 1, 2006.
Japanese Notice of Rejection mailed on Feb. 15, 2013, in Application No. 2010-540712 (8 pages).
Japanese Application 2010-540712, Decision of Rejection mailed Jul. 23, 2013, 6 pages.
Chinese Application 200880123232.9, Notice on the Third Office Action mailed Jun. 24, 2013, 9 pages.
China Application 200880123232.9, Fourth Office Action mailed Oct. 10, 2013, 6 pages.
"Fifth Office Action for China Application No. 200880123232.9", Mailed Date: Feb. 8, 2014, Filed Date: Nov. 27, 2008, 6 Pages.
China Application No. 200880123232.9, Notice on the Fourth Office Action mailed Oct. 10, 2013, 6 pages.
"Notice of Allowance Received in China Patent Application No. 200880123232.9", Mailed Date: May 12, 2014, Filed Date: Nov. 27, 2008, 4 Pages.
"Notice of Allowance Issued in Japanese Patent Application No. 2010-540712", Mailed Date: Jan. 8, 2015, 3 Pages.
Korean Application 10-2010-7013927, Preliminary Rejection mailed Oct. 28, 2014, 6 pages.

* cited by examiner

CREATING AND EDITING DYNAMIC GRAPHICS VIA A WEB INTERFACE

BACKGROUND

Desktop productivity software applications allow users to create word processing documents, spreadsheet documents, presentation documents, and other kinds of documents. These types of productivity software applications often also provide advanced functionality for creating sophisticated graphics. For example, through the use of certain desktop presentation application programs, a user can create presentation documents that include dynamic graphics (also referred to as SmartArt™ graphics).

Dynamic graphics include a potentially infinite number of shapes that are dynamically added, positioned, and sized to accommodate specified text data. For example, one type of dynamic graphic is a flow chart diagram in which new shapes are dynamically added, sized, and positioned each time a new data element is added to the flowchart. Dynamic graphics allow users to easily create sophisticated and highly polished graphic diagrams that include textual or numeric data.

Unfortunately, the capability for creating dynamic graphics has previously been limited to desktop productivity software applications. If a user does not have a locally installed software application program capable of creating dynamic graphics, it may be a very difficult and arduous process for a user to create a professional looking graphic with text. It may be similarly difficult for a user to modify the graphic to change the content, layout, style, color, or other visual characteristics of the graphic.

It is with respect to these considerations and others that the disclosure made herein is presented.

SUMMARY

Technologies are described herein for creating and editing dynamic graphics via a World Wide Web ("Web") interface. In particular, through the use of the embodiments presented herein, dynamic graphics can be created and edited within a Web browser application rather than through the use of a desktop productivity software application. This allows users to create and edit dynamic graphics even when a full-featured desktop productivity software application capable of creating dynamic graphics is unavailable.

According to one aspect presented herein, a Web service is provided and exposed for generating dynamic graphics in response to Web service requests received from Web-based clients. In particular, the Web service is configured to receive a request for a dynamic graphic from a client computer. In response to such a request, the Web service generates the requested dynamic graphic and returns the graphic to the client computer.

According to other aspects, the request received by the Web service includes parameters specifying how the dynamic graphic is to be generated. For instance, in one implementation the request includes a list of text items along with data identifying a layout type for the dynamic graphic. The Web service utilizes the list of text items and data identifying the layout type to generate the requested dynamic graphic. For instance, a dynamic graphic may be generated that has shapes corresponding to the text items that are arranged according to the specified layout type. According to other aspects, the request may further include parameters that identify a visual style and a set of colors for the dynamic graphic. The Web service may utilize these parameters to generate the dynamic graphic in the visual style and colors specified by the request.

A visual style is a collection of properties that define visual aspects of the dynamic graphic. For instance, a style may define a set of colors, visual effects, typefaces, and other properties for a dynamic graphic.

According to other aspects presented herein, a Web interface is provided for creating a dynamic graphic. In one implementation, a user interface is provided by way of a Web browser application program for specifying a list of text items and a layout type for a dynamic graphic. A request to generate the dynamic graphic may also be received through the user interface. In response to receiving such a request, a request for the dynamic graphic is transmitted to the Web service. The request may include parameters identifying the list of text items and the layout type. The requested dynamic graphic is then received from the Web service and displayed by way of the Web browser. The user interface may also provide functionality for specifying a visual style and color for the dynamic graphic. The dynamic graphic may also be modified through the use of the user interface.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
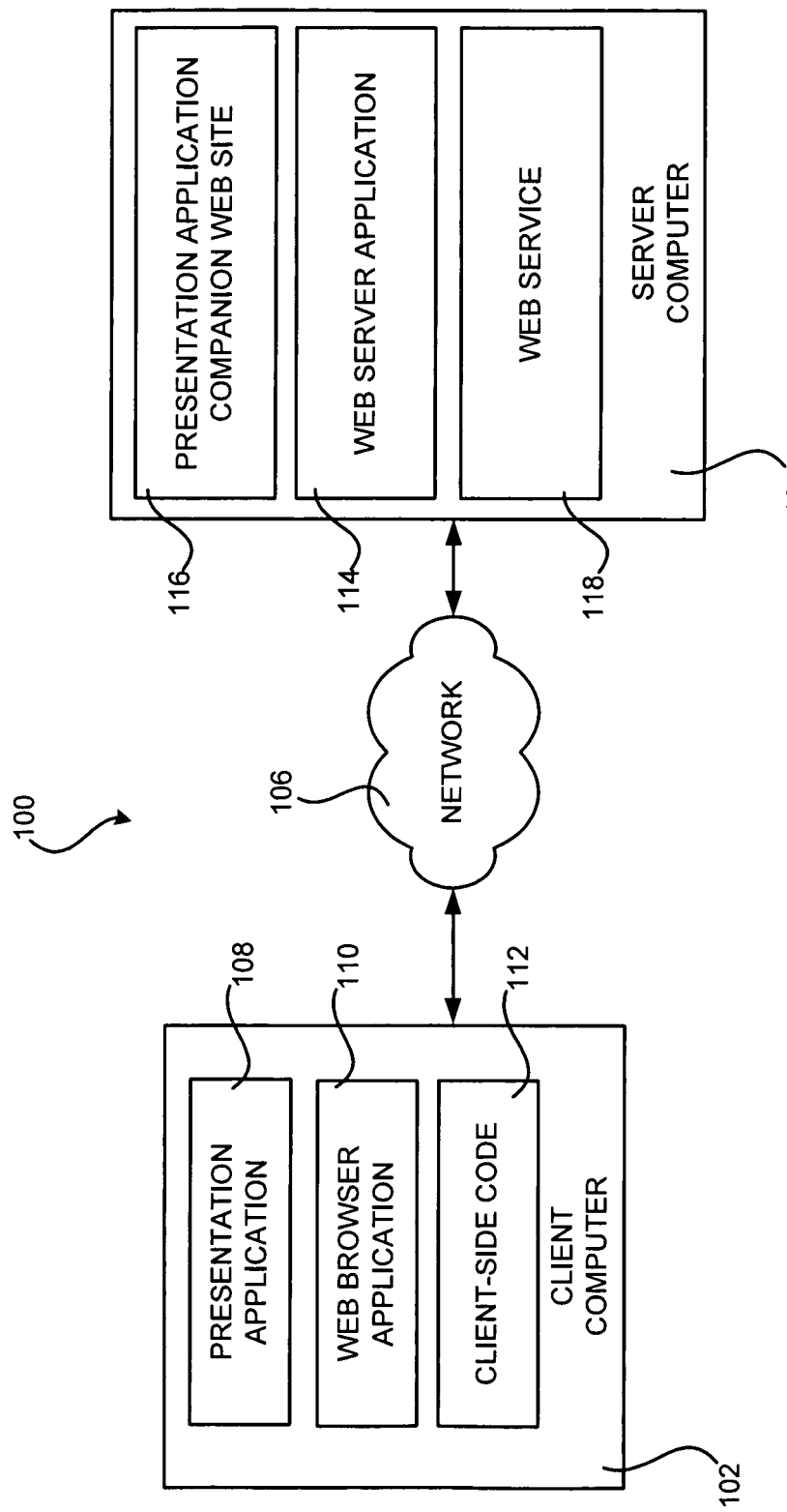
FIG. 1 is a network and computer architecture diagram showing aspects of an illustrative operating environment and several software components provided by the embodiments presented herein.

The following detailed description is directed to technologies for creating and editing dynamic graphics via a Web interface. In the following detailed description, references are made to the accompanying drawings that form a part hereof, and which are shown by way of illustration specific embodiments or examples. Referring now to the drawings, in which like numerals represent like elements throughout the several figures, technologies for creating and editing dynamic graphics via a Web interface will be described.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Turning now to FIG. 1, details will be provided regarding an illustrative operating environment and several software components provided by the embodiments presented herein. In particular, FIG. 1 shows aspects of a system 100 capable of providing functionality for creating and editing dynamic graphics via a Web interface. The system 100 includes a client computer 102 and a server computer 104. As illustrated in FIG. 1, the client computer 102 and the server computer 104 are interconnected through one or more local and wide area networks, such as the network 106. It should be appreciated that many more network connections may be utilized than illustrated in FIG. 1.

In one embodiment, the client computer 102 illustrated in FIG. 1 comprises a standard desktop or laptop computer system capable of executing an operating system and one or more application programs. It should be appreciated, however, that in other embodiments the client computer 102 comprises another type of computing device. For instance, according to embodiments, the client computer 102 may comprise a mobile computing device such as a mobile telephone, a smart phone, an ultra-mobile personal computer, a tablet personal computer, or another type of mobile computing device. Other devices may also be utilized in a similar manner.

According to embodiments the client computer 102 is operative to execute a presentation application 108. The presentation application 108 comprises a desktop productivity software application for creating presentation documents. For instance, in one implementation the presentation application 108 comprises the POWERPOINT presentation application from MICROSOFT CORPORATION of Redmond, Wash. The presentation application 108 also provides functionality for creating dynamic graphics for inclusion in a presentation document. As discussed briefly above, dynamic graphics are graphics that include a potentially infinite number of shapes that are dynamically added, positioned, and sized to accommodate specified textual or numeric data. Any number of text items (0 . . . N) may appear in each shape.

If the client computer 102 is not configured with the presentation application 108, it may be difficult or impossible for a user of the client computer 102 to create presentation documents that include dynamic graphics. In order to address this difficulty, the embodiments presented herein provide a presentation application companion Web site 116 (the "Web site"). The Web site 116 is a server-based application that provides companion functionality to the presentation application 108. In particular, the application provided by the Web site 116 includes functionality for creating presentation documents through the use of a standard Web browser application program 110 ("Web browser") executing on the client computer 102. It should be appreciated that although the Web site 116 is described herein as being accessible through the public Internet, the Web site 116 may also be made available on a private internal Web site. Moreover, the Web site 116 may be accessible through a Web browser 110 as described herein or through the use of another client application capable of requesting and rendering the Web site 116.

The Web site 116 also provides functionality for creating and editing dynamic graphics within a presentation document via a Web interface. It should be appreciated that although the embodiments presented herein are discussed in the context of a Web site 116 that provides functionality for creating and editing presentation documents, the concepts and technologies presented herein for generating dynamic graphics are not limited to such an environment. Rather, the concepts and technologies presented herein for generating dynamic graphics may be utilized with any type of Web site configured for virtually any purpose or with other types of applications.

A server computer 104 provides the Web site 116 described herein. The server computer 104 comprises a standard server computer system capable of executing an operating system and one or more other programs. In particular, in the embodiments presented herein the server computer 104 executes a Web server application 114 that is configured to receive and respond to requests for the Web site 116 and its component resources. A Web service 118 also executes on the server computer 104 in conjunction with the provision of the Web site 116. As will be described in greater detail below, the Web service 118 provides functionality for generating dynamic graphics in response to requests received from the Web browser 110. In this regard, the Web browser 110 may execute client-side code 112. The client-side code 112 operates in conjunction with the Web site 116 and the Web service 118 to provide the user interface functionality described herein. The client-side code 112 may comprise JAVASCRIPT or another suitable technology for executing client-side code in conjunction with the display of a Web page. Additional details regarding the functionality provided by the Web site 116 and the Web service 118 are provided below with respect to FIGS. 2-10B.

Figure 2:
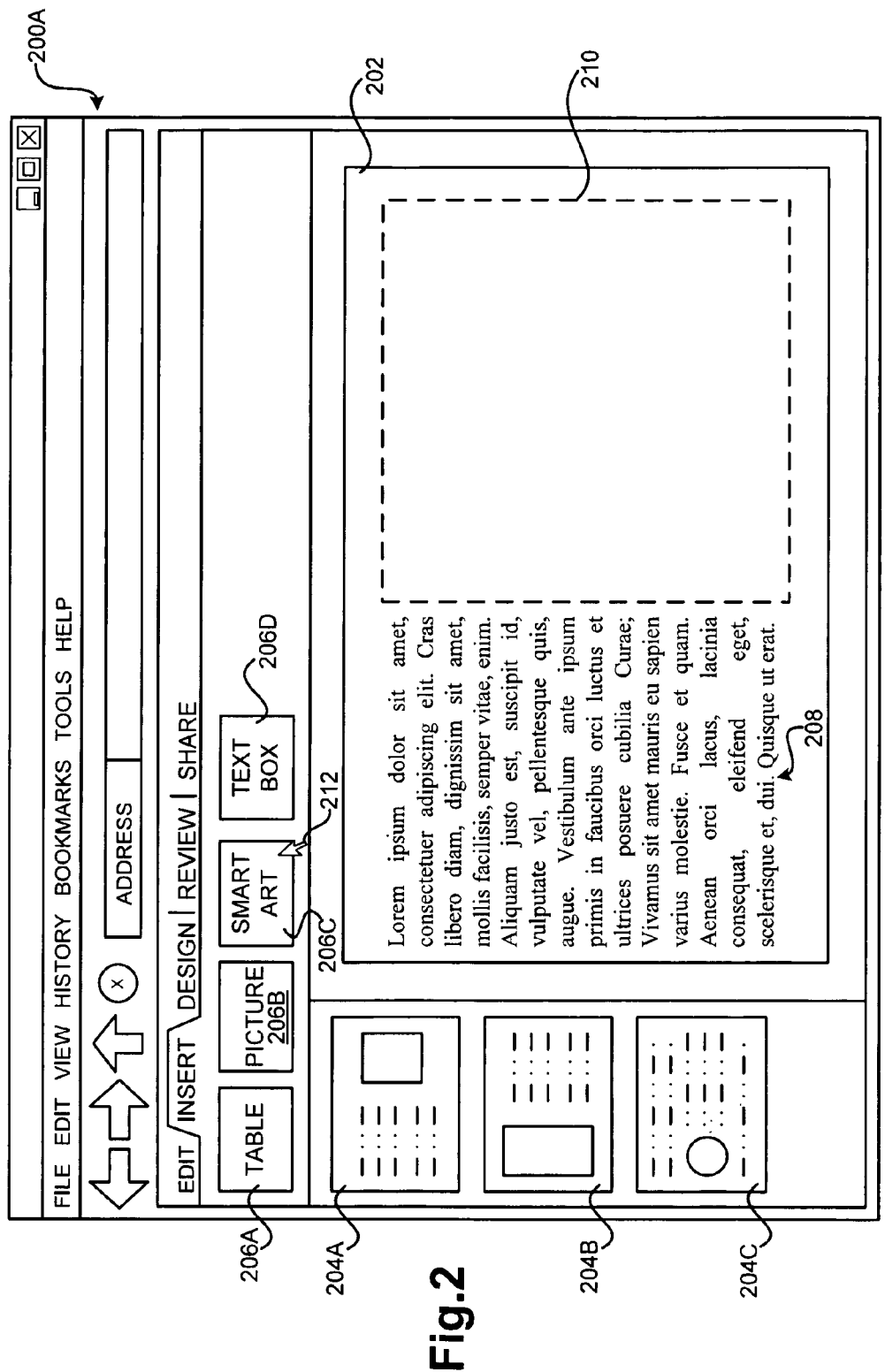
FIGS. 2-9 are screen diagrams showing illustrative screen displays generated by a Web browser application for creating and editing dynamic graphics.

FIGS. 2-9 are screen diagrams showing illustrative screen displays provided by the Web browser 110 in various embodiments presented herein. Referring now to FIG. 2, additional details regarding the functionality provided by the Web site 116 in one embodiment will be presented. The screen display 200A shown in FIG. 2 illustrates a rendering of the Web site 116 generated by the Web browser 110. In particular, the screen display 200A generated by the Web browser 110 includes user interfaces for creating and editing a presentation slide 202 (a "slide"). In one implementation, thumbnail images ("thumbnails") 204A-204C are shown that correspond to slides created using the Web site 116. For instance, the thumbnail 204A corresponds to the displayed slide 202. The thumbnails 204B-204C correspond to slides not shown by the Web browser 110.

The slide 202 may contain virtually any type of content including, but not limited to, text, static graphics, tables, video, sound, animation, and other types of multimedia content. The user interface buttons 206A, 206B, and 206D may be selected using an appropriate user input device to insert a table, a picture, or a text box, respectively. A placeholder 210 is provided in one embodiment to define the location on the slide 202 at which a newly inserted object will be placed. According to other embodiments, new objects may be freely inserted at any location on the slide 202 without the use of the placeholder 210. The Web site 116 may also provide other suitable user interfaces not illustrated or described further herein for designing, editing, reviewing, and sharing presentation slides.

According to embodiments, the presentation slide 202 may also include dynamic graphics. In this regard, a user interface button 206C is provided which, when selected, will initiate a process for placing a new dynamic graphic at the location of the placeholder 210. For example, as shown in FIG. 2, a user may select the user interface button 206C using a mouse cursor 212 or other suitable user input device to begin this process. Upon receiving such a selection, a request is transmitted to the Web service 118 for data identifying available layout types for the new dynamic graphic. The available layout types are then displayed and a user is permitted to select one of the available layout types for the new dynamic graphic. Additional details regarding this process are provided below with respect to FIG. 3.

Figure 3:
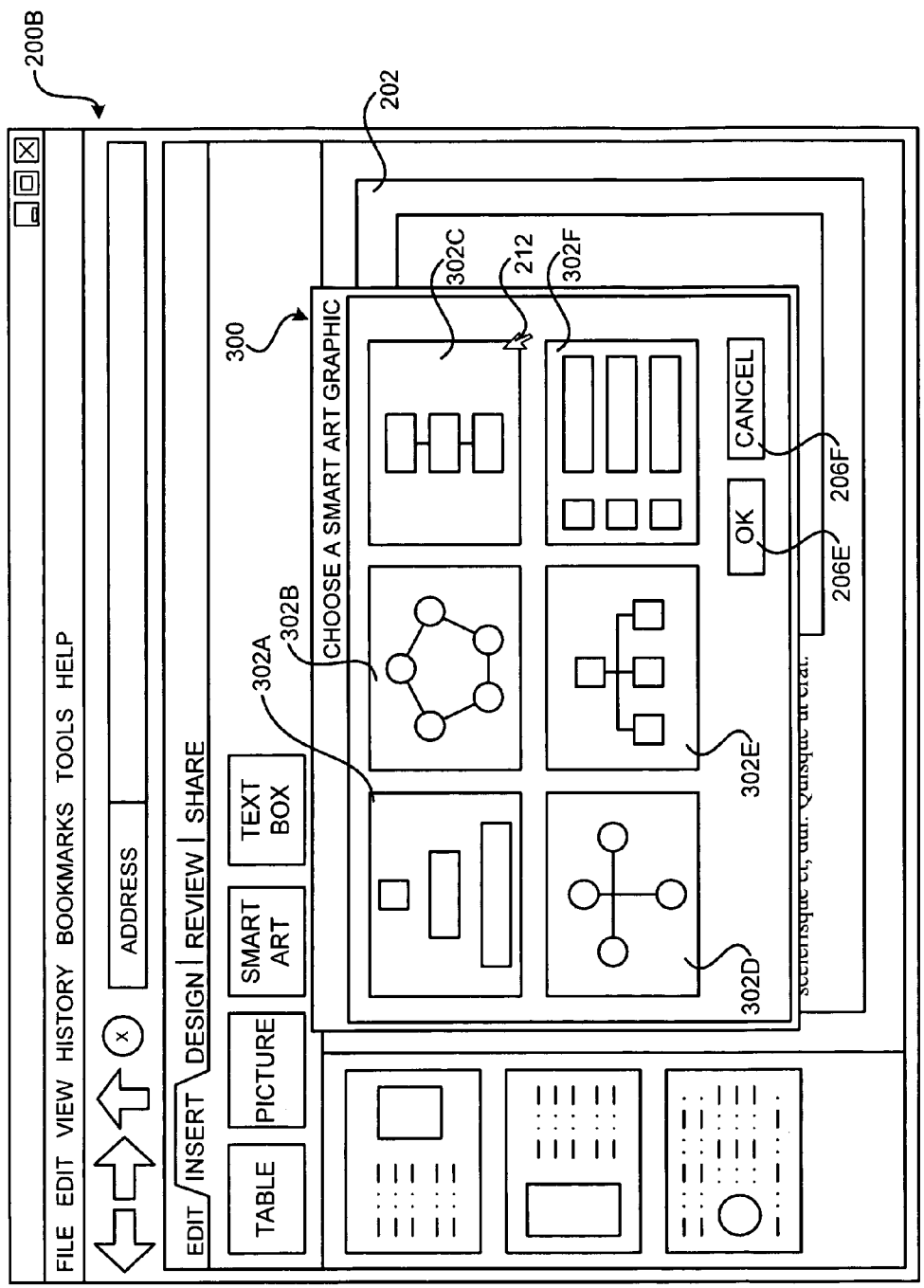

Referring now to FIG. 3, additional details regarding one process for inserting a new dynamic graphic onto the slide 202 will be described. In particular, FIG. 3 shows a screen display 200B generated by the Web browser 110 following the selection of the user interface button 206C. As mentioned briefly above, selection of the user interface button 206C will cause a request to be transmitted to the Web service 118 for data identifying the available layout types for a new dynamic graphic. A layout defines the manner in which the shapes within the dynamic graphic will be laid out. For instance, available diagram types may include process diagrams, list diagrams, hierarchy diagrams, relationship diagrams, matrix diagrams, pyramid diagrams, and others.

In response to receiving a request for the available layout types, the Web service 118 returns thumbnails 302A-302F corresponding to the available layouts in one embodiment. The thumbnails 302A-302F are displayed by the Web browser 110 in a dialog box 300 and made available for user selection. The thumbnail 302A corresponds to a pyramid diagram, the thumbnails 302B-302D correspond to cycle diagrams, the thumbnail 302C corresponds to a process diagram, the thumbnail 302E corresponds to a hierarchy diagram, and the thumbnail 302F corresponds to a list diagram. Other types of layouts may also be provided.

In order to insert a dynamic graphic corresponding to one of the available layout types onto the slide 202, a user may utilize an appropriate user input device to select one of the thumbnails 302A-302F. For instance, as shown in FIG. 3, the thumbnail 302C may be selected using the mouse cursor 212. This causes a dynamic graphic having a process diagram layout to be inserted onto the slide 202. A user may select the user interface button 206E to complete the insertion of the new dynamic graphic or may select the user interface button 206F to cancel the insertion process and return to the screen display 200A shown in FIG. 2. Once the new dynamic graphic has been placed onto the slide 202, user interfaces are provided for editing and otherwise modifying the dynamic graphic. Details in this regard are provided below with respect to FIGS. 4-9.

Figure 4:
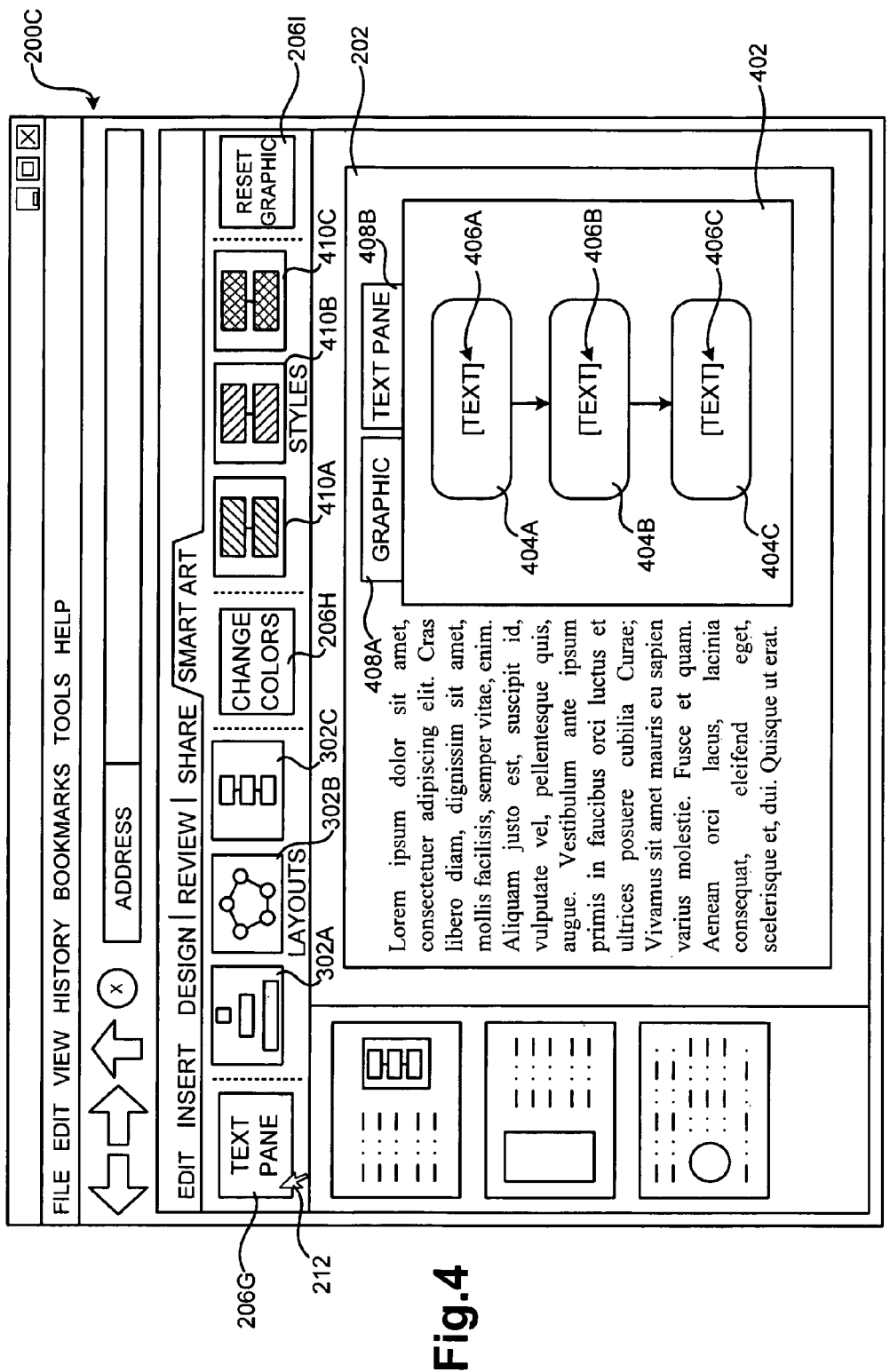

Referring now to FIG. 4, additional details regarding the user interfaces provided herein for editing a newly inserted dynamic graphic 402 will be described. In particular, FIG. 4 shows a screen display 200C generated by the Web browser 110 following the insertion of a new dynamic graphic 402 onto the slide 202. The dynamic graphic 402 was generated by the Web service 118 following the selection by a user of a desired layout type, as discussed above with respect to FIG. 3. Details regarding the communication between the Web browser 110 and the Web service 118 for generating the dynamic graphic 402 are provided below with respect to FIGS. 10A-10B.

The exemplary dynamic graphic 402 shown in FIG. 4 is a process diagram that includes the shapes 404A-404C. Text items 406A-406C are also provided within each of the shapes 404A-404C, respectively. Default placeholder text is inserted into each of the shapes 404A-404C when a new dynamic graphic is created. In one embodiment, a user may edit the text items 406A-406C directly by selecting the text with an appropriate user input device and typing new text. Alternatively, another user interface may be provided for editing the text, adding new shapes, arranging the order of the shapes, and performing other functions. Such an interface may be displayed in response to the selection of the user interface tab 408B or the user interface button 206G using an appropriate user input mechanism, such as the mouse cursor 212. One such user interface is described in detail below with respect to FIGS. 5-6. Following the editing of the dynamic graphic 402 using the user interface shown in FIGS. 5-6 and described below, a user may return to the user interface shown in FIG. 4 by selecting the user interface tab 408A.

According to embodiments, user interfaces may also be provided for modifying the layout of the dynamic graphic 402, for changing the colors of the dynamic graphic 402, and for modifying the visual style of the dynamic graphic 402. For instance, in one embodiment, the user interface buttons 302A-302C may be utilized to display thumbnails of the available layout types. Selection of one of the user interface buttons 302A-302C will cause the dynamic graphic 402 to be reformatted according to the layout type corresponding to the selected user interface button. A call to the Web service 118 returns the modified dynamic graphic 402.

According to other embodiments, the client-side code 112 may monitor the location of the mouse cursor 212. If the mouse cursor 212 "hovers" over one of the user interface buttons 302A-302C, a call is made to the Web service 118 for an updated dynamic graphic 402. The dynamic graphic 402 may then be displayed to the user to provide a live preview of the layouts corresponding to the user interface buttons 302A-302C. Additional details regarding modification of the layout type of the dynamic graphic 402 will be provided below with respect to FIG. 8.

The user interface buttons 410A-410C may be utilized in a similar manner to the buttons 302A-302C to modify the visual style of the dynamic graphic 402. For instance, styles may be applied through the selection of the buttons 410A-410C for modifying the material, three-dimensional properties, outline properties, fill properties, and shadow of the dynamic graphic 402. Other visual aspects may be modified in a similar manner. A live preview of the available styles may also be provided in the manner described above. It should be appreciated that other user interface controls may also be provided to show the user a large number of available layout types and styles. A user interface button 206I may also be provided which, when selected, will reset the dynamic graphic 402 to its original visual state. Additional details regarding modification of the visual style of the dynamic graphic 402 will be provided below with respect to FIG. 9.

Figure 5:
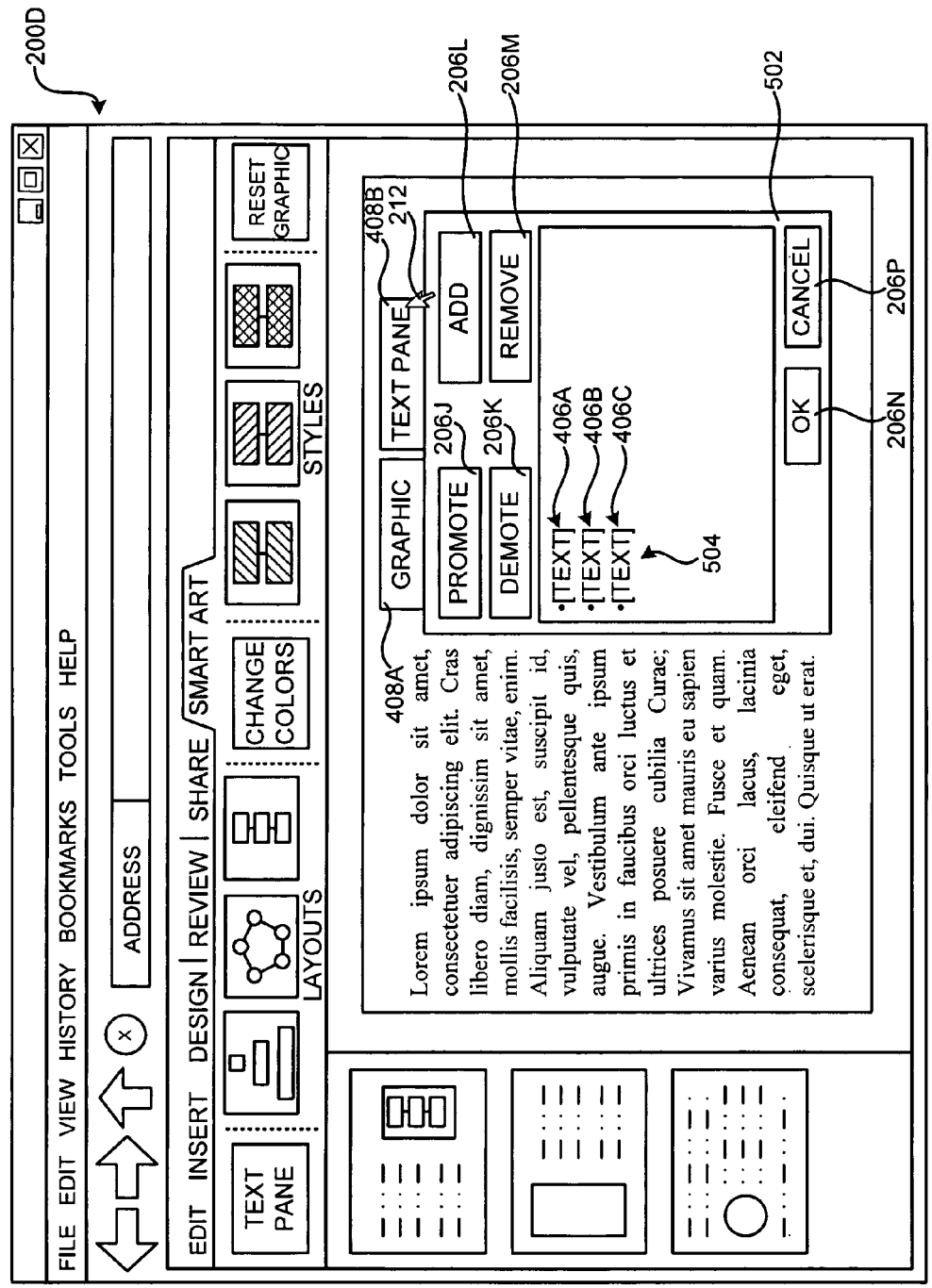
Figure 6:
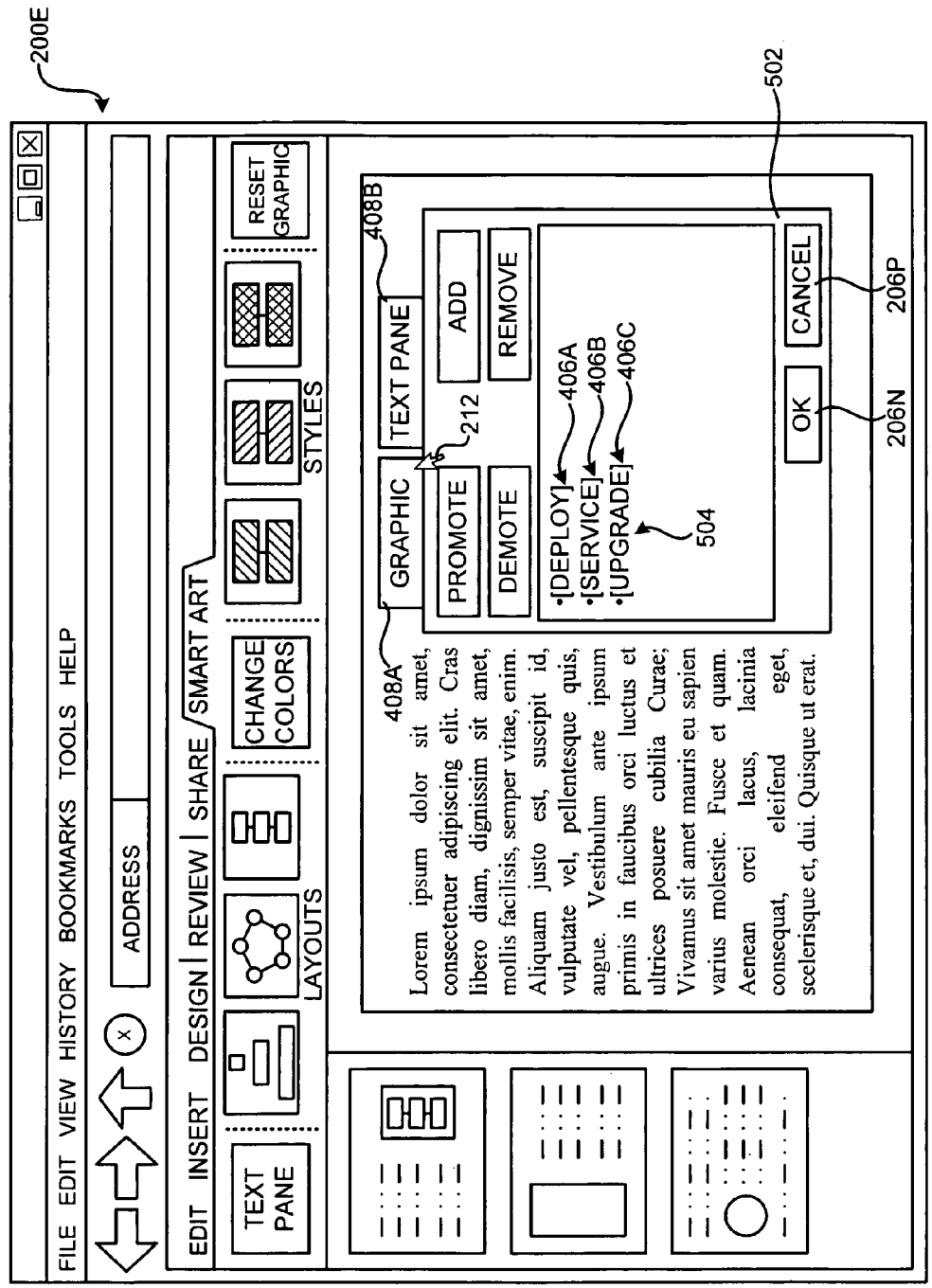

Turning now to FIG. 5, additional details will be provided regarding one user interface provided herein for editing the dynamic graphic 402, including editing the text items 406A-406C, adding new shapes, arranging the order of the shapes, and performing other functions. In particular, FIG. 5 shows a screen diagram 200D generated by the Web browser 110 following the selection by a user of the user interface tab 408B using an appropriate user input device, such as the mouse cursor 212.

The user interface illustrated in FIG. 5 includes a list 504 showing all of the text items 406A-406C corresponding to the shapes 404A-404C in the dynamic graphic 402. The content of the list 504 is utilized by the Web service 118 to layout and render the appropriate dynamic graphic 402. For instance, the illustrative list 504 shown in FIG. 5 includes three text items 406A-406C. As a result, the dynamic graphic 402 generated based upon the list 504 will include three shapes 404A-404C, with each shape containing one of the text items 406A-406C, respectively.

Addition of a new text item to the list 504 will cause an additional shape to be added to the dynamic graphic 402 in a visually appropriate fashion. Removal of one of the text items 406A-406C from the list 504 will cause the layout of the shapes corresponding to the remaining text items to be adjusted appropriately. Once mechanism for laying out shapes in a dynamic graphic in this manner is described in U.S. Patent Publication No. US2006/0209093A1, entitled "METHOD AND COMPUTER-READABLE MEDIUM FOR GENERATING GRAPHICS HAVING A FINITE NUMBER OF DYNAMICALLY SIZED AND POSITIONED SHAPES", published on Sep. 21, 2006, which is assigned to the assignee of the instant patent application and expressly incorporated by reference herein in its entirety.

Figure 7:
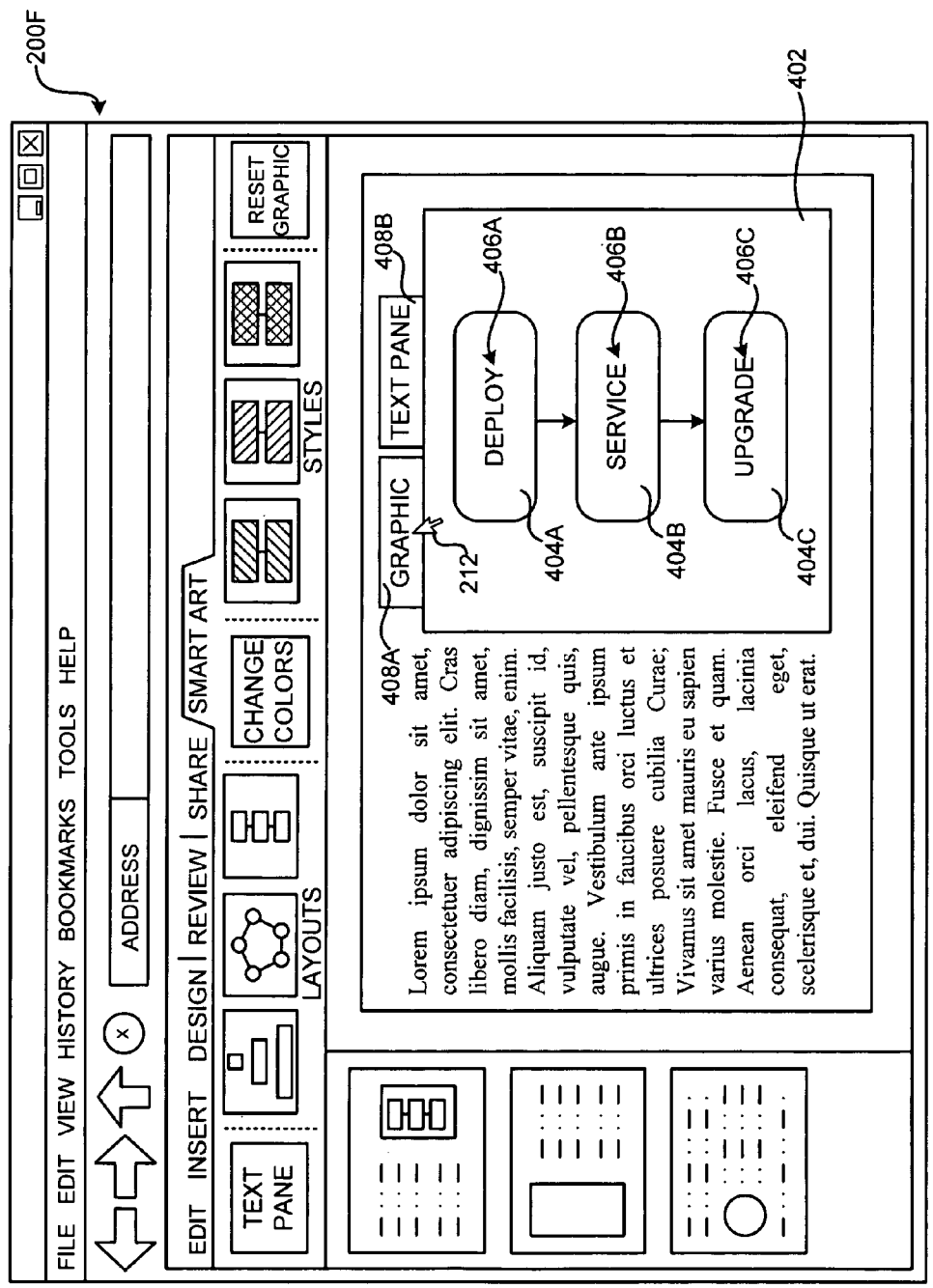

According to embodiments, the text items 406A-406C may be selected and edited directly to change their content. For instance, in one example illustrated in FIG. 6, the default text has been replaced for the text items 406A-406C with the custom text "DEPLOY", "SERVICE", and "UPGRADE", respectively. When a user selects the user interface tab 408A to return to the view of the dynamic graphic 402, the customized text items 406A-406C are reflected on the dynamic graphic 402 as illustrated in FIG. 7. According to embodiments, a user interface button 206N may also be provided which, when selected, will cause the modifications to the list 504 to be applied to the dynamic graphic. The user interface button 206P may be selected to cancel any modifications to the list 504. As will be described in greater detail below, a Web service call is performed to the Web service 118 with the modified text items 406A-406C to generate the updated dynamic graphic 402 shown in FIG. 7. In another embodiment, the Web service 118 is called to process modifications to the list 504 in real-time as the modifications are made. In this manner, the list 504 and the dynamic graphic 402 are updated in real-time. Because the modifications to the list 504 are processed as they are made, the user interface button 206N is not utilized in this embodiment.

According to other aspects, the user interface illustrated in FIG. 5 also provides functionality for modifying the order of the text items 406A-406C in the list 504. For instance, in one embodiment the user interface button 206J may be selected to promote a selected text item 406 in the list 504. The user interface button 206K may be similarly selected to demote a selected text item 206 in the list 504. Modifications to the order of the text items 406A-406C will be reflected in the dynamic graphic 402.

According to embodiments, the user interface button 206L may also be selected to add a new text item to the list 504, and the user interface button 206M may be selected to remove a text item from the list 504. As discussed above, these modifications are reflected in the dynamic graphic 402 through a Web service call to the Web service 118. In response to such a call, the Web service 118 generates a new dynamic graphic 402. Additional details regarding this process are provided below with respect to FIGS. 10A-10B.

Figure 8:
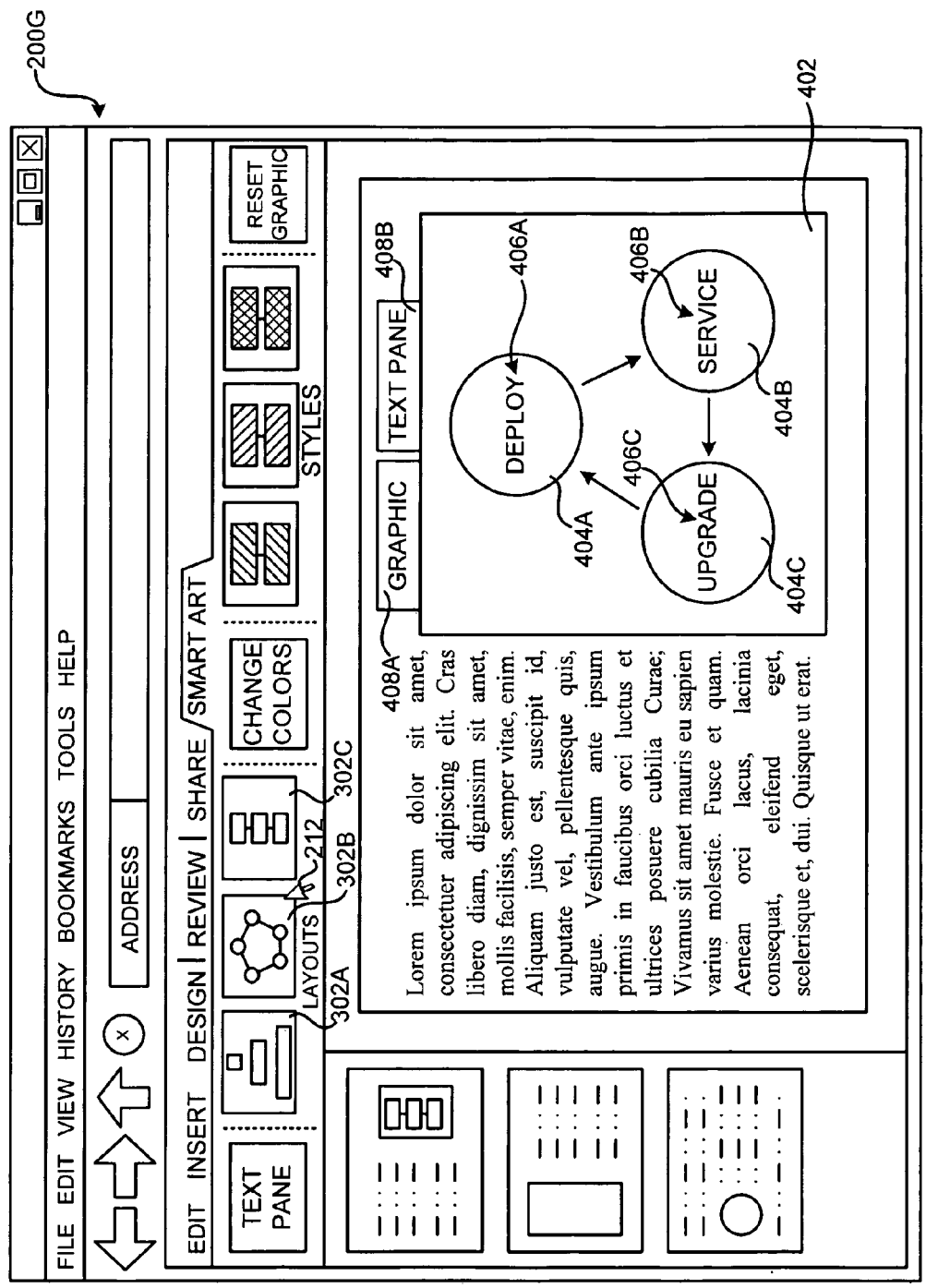

Referring now to FIG. 8, additional details will be provided regarding one user interface disclosed herein for modifying the layout type of the dynamic graphic 402. In particular, FIG. 8 is a screen display 200G generated by the Web browser 110 that illustrates functionality provided herein for modifying the layout type of the dynamic graphic 402. As discussed briefly above, the user interface buttons 302A-302C may be utilized to display thumbnails of the available layout types. Selection of one of the user interface buttons 302A-302C will cause the dynamic graphic 402 to be reformatted according to the layout type corresponding to the selected user interface button.

In one example shown in FIG. 8, the user interface button 302B has been selected using the mouse cursor 212. In response to such a selection, a Web service call is made to the Web service 118 to regenerate the dynamic graphic 402 in a layout type corresponding to the thumbnail shown on the user interface button 302B. In this example, the layout type for the dynamic graphic 402 has been changed from the process diagram shown previously to a cycle diagram as shown in FIG. 8. As a result, the shapes 406A-406C have been changed to circles, resized, and re-positioned. The text items 404A-404C within each of the shapes 406A-406C remain the same. This modification is accomplished through a call to the Web service 118 following the selection of the user interface button 302B. Additional details regarding this process will be provided below with respect to FIGS. 10A-10B.

Figure 9:
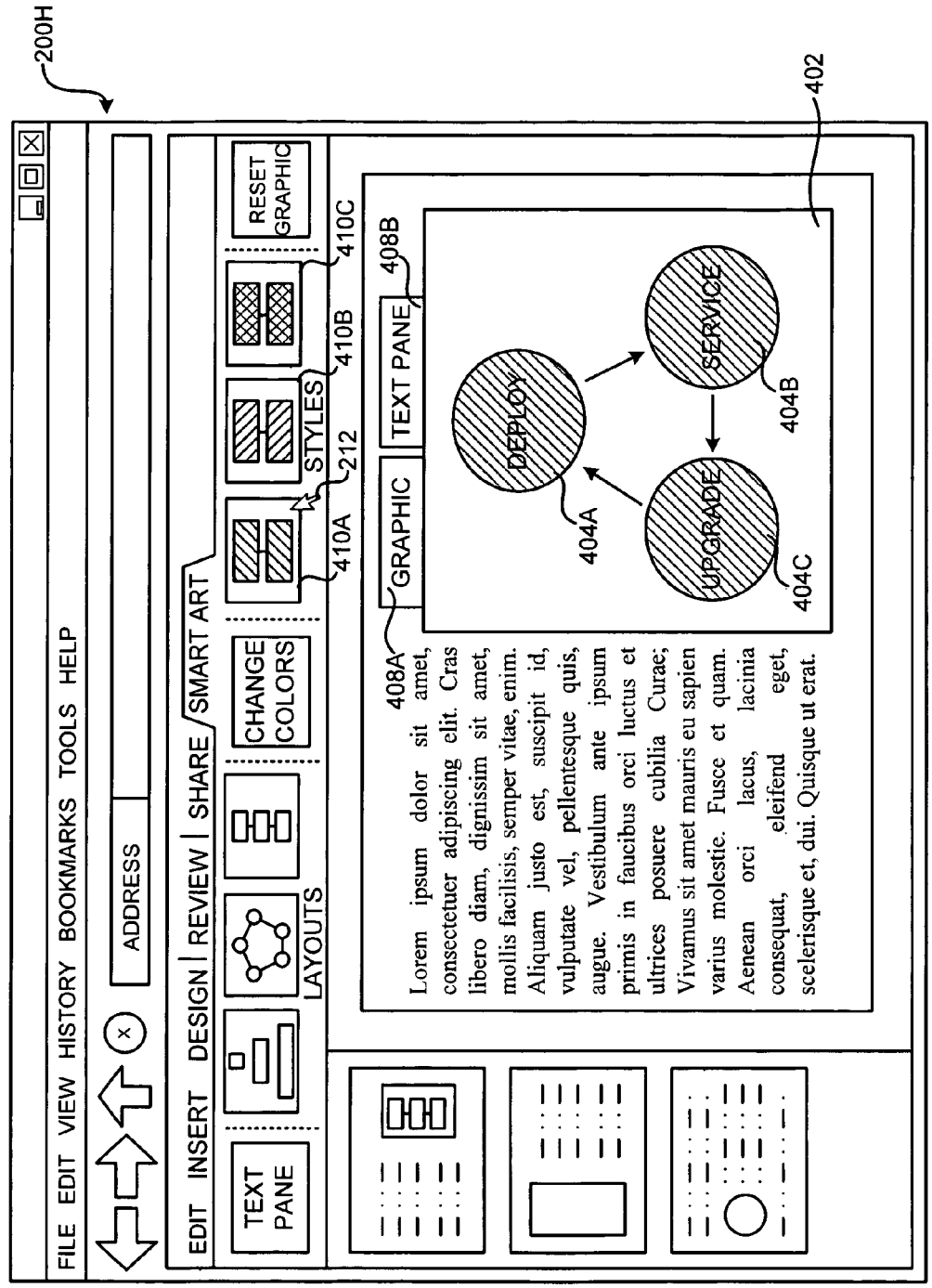

Turning now to FIG. 9, additional details will be provided regarding one user interface provided herein for modifying the visual style of the dynamic graphic 402. In particular, FIG. 9 is a screen display 200H generated by the Web browser 110 that illustrates functionality provided herein for modifying the visual style of the dynamic graphic 402. As discussed briefly above, the user interface buttons 410A-410C may be utilized to display thumbnails corresponding to different visual styles for the dynamic graphic 402. Selection of one of the user interface buttons 410A-410C will cause the dynamic graphic 402 to be reformatted according to the visual style corresponding to the selected user interface button.

In the example shown in FIG. 9, the user interface button 410A has been selected using the mouse cursor 212. In response to such a selection, a Web service call is made to the Web service 118 to regenerate the dynamic graphic 402 in a visual style corresponding to the thumbnail shown on the user interface button 410A. In this example, the visual style for each of the shapes 404A-404C has been modified. It should be appreciated that the color of all of the shapes in the dynamic graphic, or one shape individually, may be modified in a similar manner. Additional details regarding the communication with the Web service 118 for modifying the visual style of the dynamic graphic 402 will be provided below with respect to FIGS. 10A-10B.

Figure 10A:
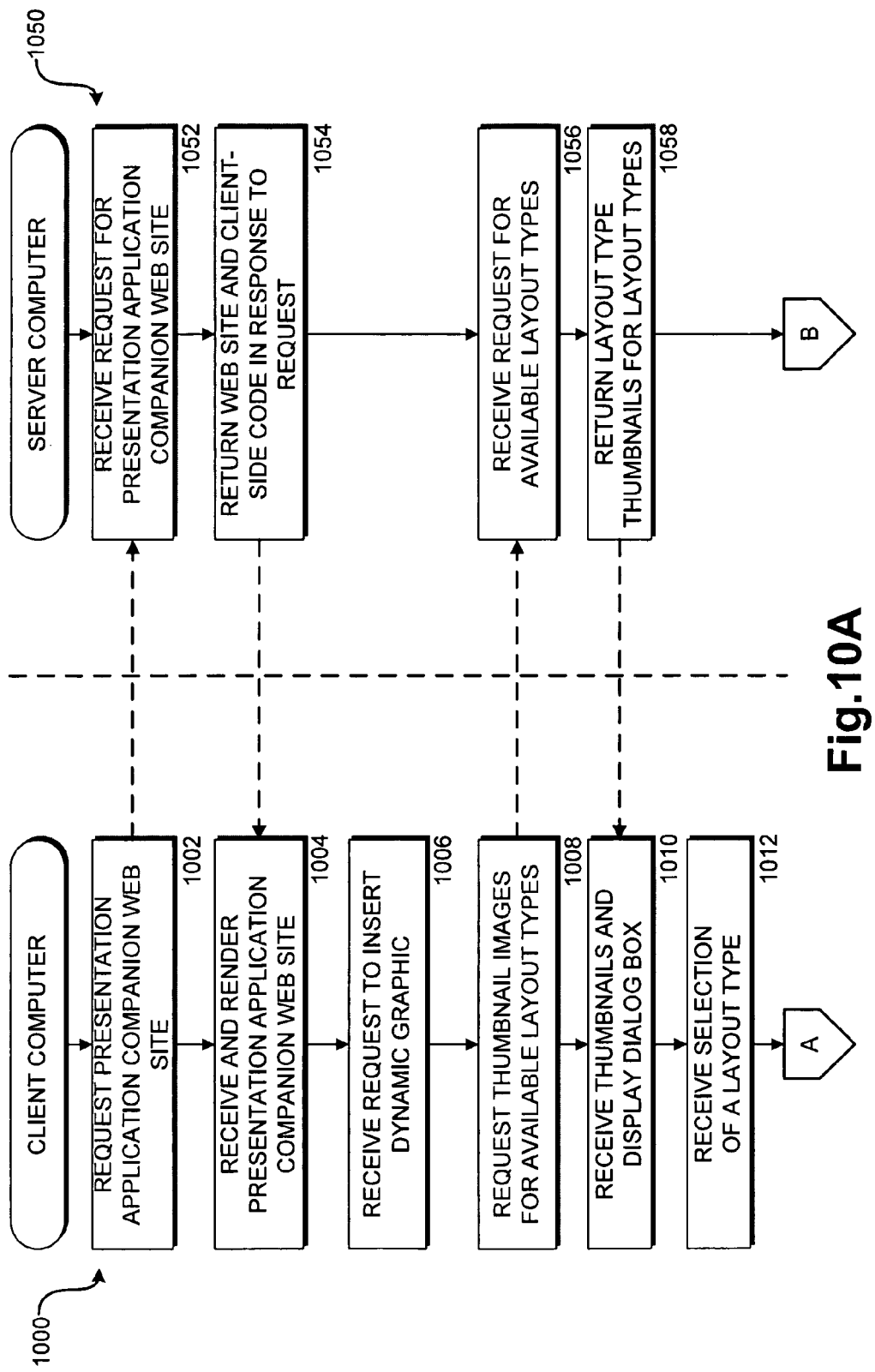
FIGS. 10A-10B are flow diagrams showing aspects of one illustrative process provided herein for creating and editing dynamic graphics via a Web interface.
Figure 10B:
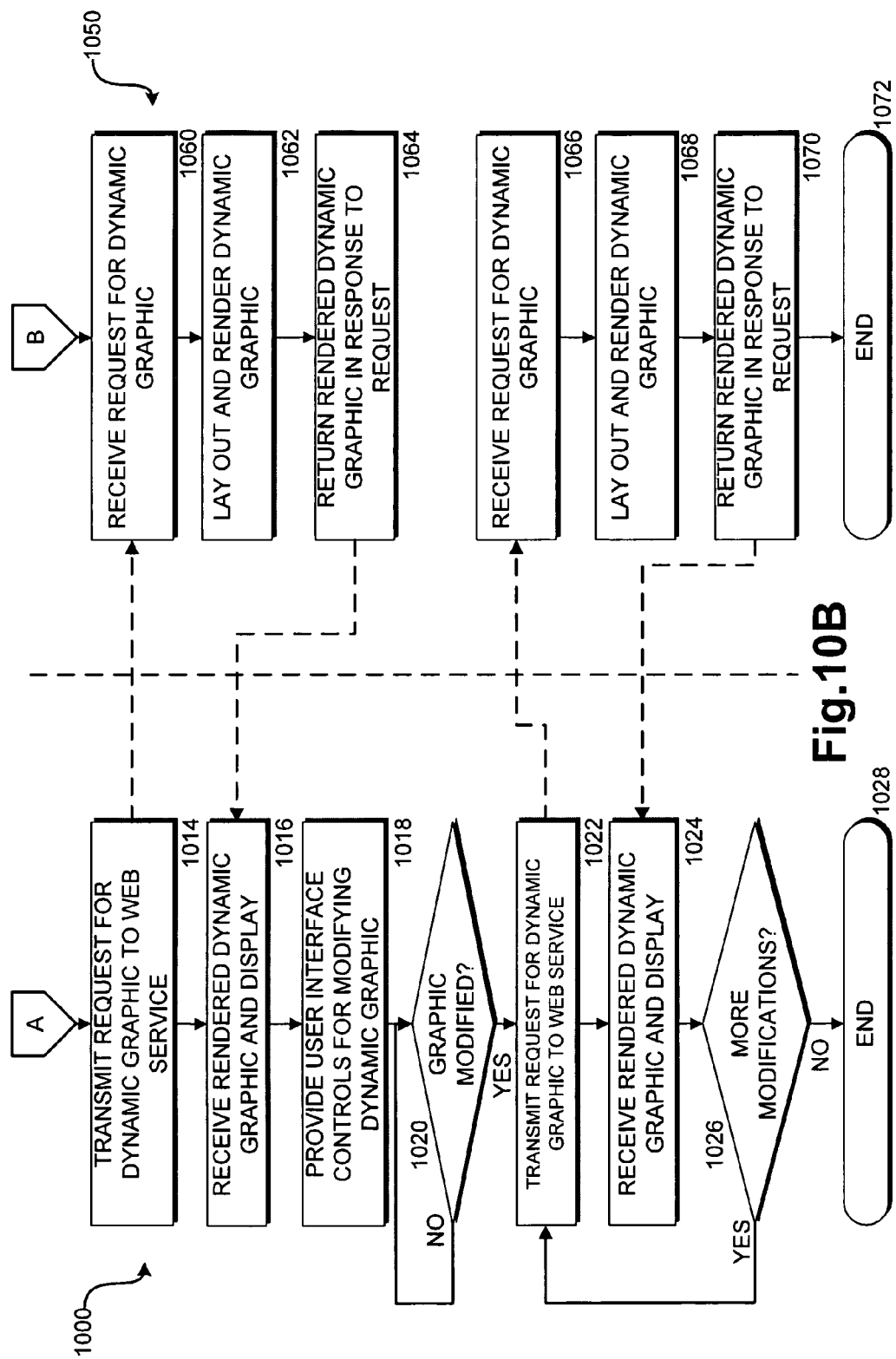

Referring now to FIGS. 10A-10B, additional details will be provided regarding the embodiments presented herein for creating and editing a dynamic graphic via a Web interface. In particular, FIGS. 10A-10B are flow diagrams showing a routine 1000 and a routine 1050 that together illustrate aspects of the operation of the client computer 102 and the server computer 104 for providing the functionality described herein for creating and editing a dynamic graphic via a Web interface. The routine 1000 illustrates the operation of the client computer 102 in this regard while the routine 1050 illustrates the operation of the server computer 104. The routines 1000 and 1050 are discussed together herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 1000 begins at operation 1002, where the Web browser 110 executing on the client computer 102 requests a page of the Web site 116 from the server computer 104. The server computer 104 receives the request at operation 1052 of the routine 1050. The server computer 104 returns the requested page to the Web browser 110 at operation 1054 of the routine 1050. The client computer 102 receives the page of the Web site 116 at operation 1004 and renders the page. The screen display provided by the Web browser 110 following the rendering of the page may appear similar to the screen display 200A described above with respect to FIG. 2.

From operation 1004, the routine 1000 continues to operation 1006, where the Web browser 110 receives a request to insert a new dynamic graphic 402 into the slide 202. As discussed above with respect to FIGS. 2-3, such a request may come in the form of a user selection of the user interface button 206C. In response to receiving such a request, the Web browser 110 transmits a request to the Web service 118 for data identifying the available layout types for a new dynamic graphic 402. As discussed above, in one implementation the Web service 118 provides thumbnails 302A-302F that graphically illustrate the available layout types for a new dynamic graphic 402 in response to such a request. The Web service 118 receives this request and returns the thumbnails at operations 1056 and 1058 of the routine 1050, respectively. Each of the thumbnails 302A-302F may be associated with a parameter that uniquely identifies a corresponding layout type.

At operation 1010, the Web browser 110 receives the thumbnails 302A-302F and displays the dialog box 300 discussed above with reference to FIG. 3. A selection is then received from a user at operation 1012 of one of the available layout types. For instance, a user may utilize the mouse cursor 212 to select a thumbnail 302A-302F corresponding to the desired layout type. This process is discussed in detail above with respect to FIG. 3. From operation 1012, the routine 1000 continues to operation 1014, illustrated in FIG. 10B.

At operation 1014, the Web browser 110 transmits a request to the Web service 118 for the dynamic graphic 402. According to embodiments, several parameters are included with the request. For instance, the request may include the list 502 of text items 406A-406C that are utilized to generate the dynamic graphic 402. Data identifying the selected layout type for the dynamic graphic may also be transmitted in the request. As discussed above, the Web service 118 utilizes this data to layout and render the dynamic graphic 1014 in the specified layout type, including shapes corresponding to each of the text items 406A-406C in the list 502. According to other embodiments, additional parameters may also be included with the request, including data identifying a style and a color for the dynamic graphic 402. The Web service 118 likewise uses these parameters to generate the dynamic graphic 402 in the desired visual style and color.

The Web service 118 receives the request for a dynamic graphic 402 at operation 1060 of the routine 1050. In response to receiving the request, the Web service 118 lays out and renders the dynamic graphic 402 at operation 1062 in the manner described above. The rendered dynamic graphic 402 is returned to the Web browser 110 in response to the request at operation 1064 of the routine 1050. It should be appreciated that the dynamic graphic 402 may be rendered using a standard graphic file format suitable for transmission on the Web, such as the Portable Network Graphics ("PNG") format.

The Web browser 110 receives the dynamic graphic 402 at operation 1016 and displays the dynamic graphic 402 as described above with respect to FIGS. 2-9. The routine 1000 then continues to operation 1020, where the client-side code 112 determines whether a request has been made to modify the dynamic graphic, such as the modification of the text items contained in the graphic or a modification to the layout, style, or color of the dynamic graphic 402. User interfaces for modifying these aspects of the dynamic graphic 402 are described above with reference to FIGS. 4-9.

If, at operation 1020, it is determined that the dynamic graphic 402 has been modified, the routine 1000 continues to operation 1022 where a second request is transmitted to the Web service 118 for a dynamic graphic 402. The second request includes parameters corresponding to the modifications to the dynamic graphic 402. For instance, if the layout of the dynamic graphic 402 was modified, the request transmitted at operation 1022 would include data identifying the modified layout type for the dynamic graphic 402. Similarly, if the list 504 of text items 406A-406C, the style, or the color of the dynamic graphic 402 were modified, the request transmitted at operation 1022 would include a modified list of text items, data identifying the modified style, and/or data identifying the modified color, respectively. Such a request may be transmitted to the Web service 118 each time a modification to the dynamic graphic 402 is made. Alternatively, a sequence of modifications may be recorded and transmitted to the Web service 118 all at once to conserve network bandwidth.

The Web service 118 receives the second request for a dynamic graphic 402 at operation 1066 of the routine 1050. In response to receiving the request, the Web service 118 lays out and renders the modified dynamic graphic 402 at operation 1068 in the manner described above. The Web service 118 then returns the rendered dynamic graphic 402 to the Web browser 110 in response to the request at operation 1070 of the routine 1050. From operation 1070, the routine 1050 continues to operation 1072, where it ends.

At operation 1024 of the routine 1000, the Web browser 110 receives and displays the modified dynamic graphic. The routine 1000 then continues to operation 1026, where a determination is made as to whether additional modifications have been made to the dynamic graphic 402. If so, the routine 1000 returns to operation 1022, described above, where the modifications are processed by sending additional requests to the Web service 118 for the dynamic graphic 402. If no additional modifications have been made, the routine 1000 continues to operation 1028, where it ends.

It should be appreciated that, according to embodiments, the Web service 118 operates in a stateless mode of operation. In this mode of operation, the Web service 118 does not maintain any information regarding the state of the dynamic graphic 402. Each time the Web browser 110 transmits a request for a dynamic graphic 402, all of the parameters are provided. In this manner, the Web service 118 can remain stateless with respect to the Web browser 110.

According to other implementations, the Web service 118 operates in a stateful mode of operation wherein it maintains the state of the dynamic graphic 402. For instance, the Web service 118 may maintain data identifying the layout type, list 504 of text items 406, style, and color, for the dynamic graphic 402. In this manner, the Web browser 110 only needs to transmit changed parameters to the Web service 118 rather than all of the parameters, thereby saving network bandwidth. This mode of operation may be useful when multiple users are concurrently permitted to edit the presentation slide 202 and the dynamic graphic 402.

Figure 11:
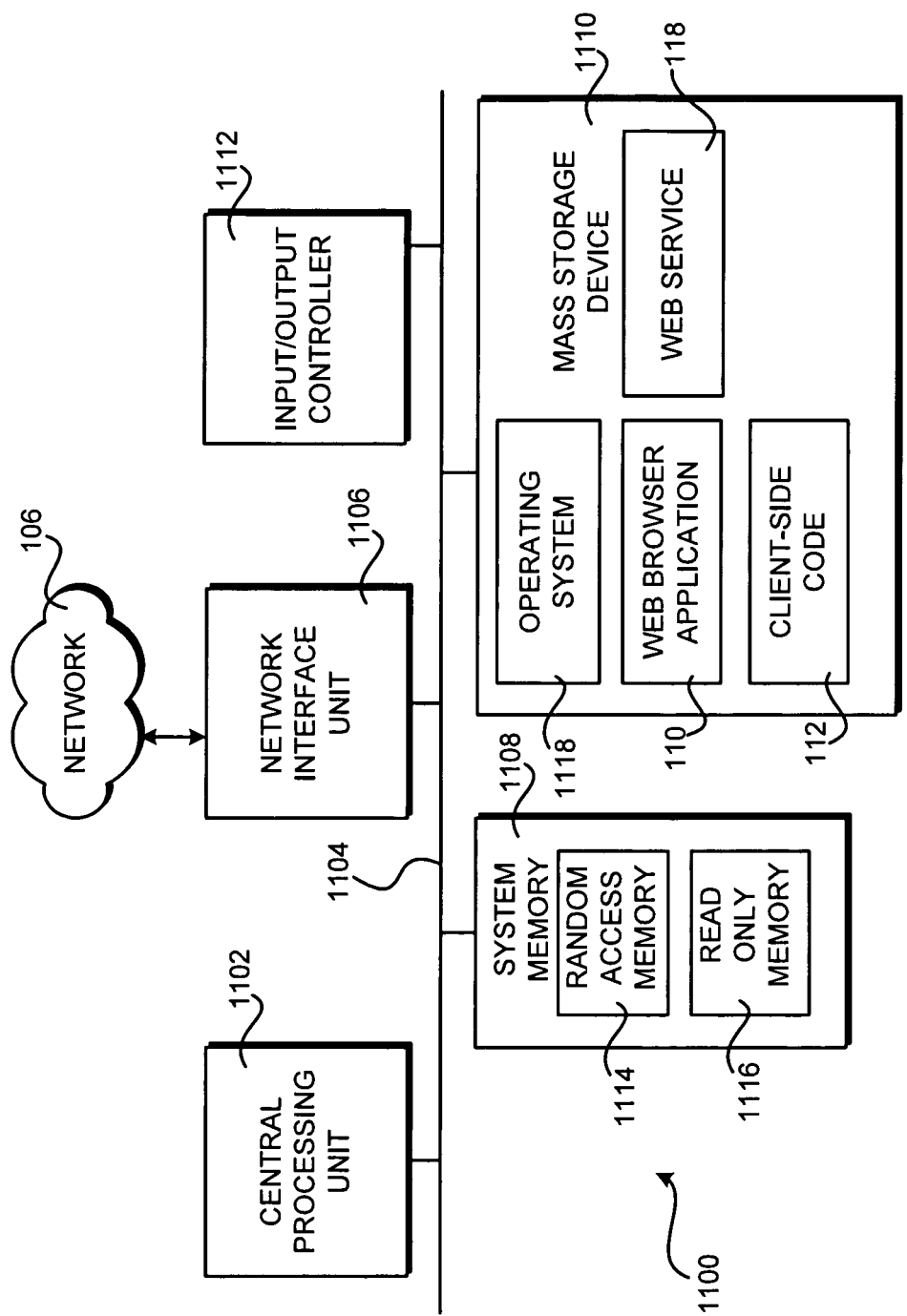
FIG. 11 is a computer architecture diagram showing an illustrative computer hardware and software architecture for a computing system capable of implementing aspects of the embodiments presented herein.

FIG. 11 shows an illustrative computer architecture for a computer 1100 capable of executing the software components described herein for creating and editing dynamic graphics via a Web interface in the manner presented above. The computer architecture shown in FIG. 11 illustrates a conventional desktop, laptop, or server computer and may be utilized to execute any aspects of the software components presented herein described as executing on the client computer 102 or the server computer 104.

The computer architecture shown in FIG. 11 includes a central processing unit 1102 ("CPU"), a system memory 1108, including a random access memory 1114 ("RAM") and a read-only memory ("ROM") 1116, and a system bus 1104 that couples the memory to the CPU 1102. A basic input/output system containing the basic routines that help to transfer information between elements within the computer 1100, such as during startup, is stored in the ROM 1116. The computer 1100 further includes a mass storage device 1110 for storing an operating system 1118, application programs, and other program modules, which are described in greater detail herein.

The mass storage device 1110 is connected to the CPU 1102 through a mass storage controller (not shown) connected to the bus 1104. The mass storage device 1110 and its associated computer-readable media provide non-volatile storage for the computer 1100. Although the description of computer-readable media contained herein refers to a mass storage device, such as a hard disk or CD-ROM drive, it should be appreciated by those skilled in the art that computer-readable media can be any available computer storage media that can be accessed by the computer 1100.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 1100.

According to various embodiments, the computer 1100 may operate in a networked environment using logical connections to remote computers through a network such as the network 106. The computer 1100 may connect to the network 106 through a network interface unit 1106 connected to the bus 1104. It should be appreciated that the network interface unit 1106 may also be utilized to connect to other types of networks and remote computer systems. The computer 1100 may also include an input/output controller 1112 for receiving and processing input from a number of other devices, including a keyboard, mouse, or electronic stylus (not shown in FIG. 11). Similarly, an input/output controller may provide output to a display screen, a printer, or other type of output device (also not shown in FIG. 11).

As mentioned briefly above, a number of program modules and data files may be stored in the mass storage device 1110 and RAM 1114 of the computer 1100, including an operating system 1118 suitable for controlling the operation of a networked desktop, laptop, or server computer. The mass storage device 1110 and RAM 1114 may also store one or more program modules. In particular, the mass storage device 1110 and the RAM 1114 may store the Web browser 110, client-side code 112, and the Web service 118, each of which was described in detail above with respect to FIGS. 1-10B. The mass storage device 1110 and the RAM 1114 may also store other types of program modules.

Based on the foregoing, it should be appreciated that technologies for creating and editing a dynamic graphic via a Web user interface are provided herein. It should be appreciated that the user interface controls shown in the FIGURES and described herein are merely illustrative and that any suitable user interface control or screen layout may be utilized. It should also be appreciated that other client-or server-side applications, scripts, or other program components may utilize the Web service 118 provided herein programmatically without the provision of a user interface for creating or editing the dynamic graphic. In these embodiments, a program component may call the Web service 118 in the manner described herein to generate a dynamic graphic. The program component may then utilize the dynamic graphic for any suitable purpose. Additional calls may be made to modify the dynamic graphic as presented herein. It should also be appreciated that other properties of a dynamic graphic, including properties unrelated to the visual appearance of a dynamic graphic, may be modified using the technologies and concepts presented herein.

It should also be appreciated that although the subject matter presented herein has been described in language specific to computer structural features, methodological acts, and computer readable media, the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for creating a dynamic graphic via a world wide web (Web) interface, the method comprising:

exposing a Web service at a server computer;

receiving a first request at the Web service for a dynamic graphic, the first request including order information for a plurality of shape elements of a presentation document, wherein the order information comprises an order of a plurality of text items, each text item corresponding to a shape element;

in response to receiving the first request, generating the dynamic graphic based upon the first request, wherein the dynamic graphic comprises a first layout of the plurality of shape elements, wherein each shape element includes a textual element that corresponds to a text item of the plurality of text items, wherein a first shape element includes a first textual element corresponding to a first text item, wherein the order information of the plurality of text items defines a relationship between the plurality of shape elements in the first layout, wherein the first layout is one of a plurality of layouts, and wherein at least two of the plurality of layouts differently define the positioning of the plurality of shape elements for the dynamic graphic;

returning the dynamic graphic in response to the first request; and when a second request including an indicator to change at least one shape element of the plurality of shape elements is received, and in response to receiving the second request, generating a modified dynamic graphic based on the second request and returning the modified dynamic graphic in response to the second request, wherein the modified dynamic graphic comprises a second layout of the plurality of shape elements including a second shape element that includes the first textual element corresponding to the first text item, wherein the second shape element is different from the first shape element, and wherein the order information of the plurality of text items also defines the relationship between the plurality of shape elements in the second layout.

2. The method of claim 1, wherein the first request comprises a list of text items for the dynamic graphic and data identifying a layout type for the dynamic graphic.

3. The method of claim 2, wherein generating the dynamic graphic comprises generating a dynamic graphic having a type corresponding to the layout type and including shape elements corresponding to the text items identified in the first request.

4. The method of claim 3, wherein the first request further comprises data identifying a visual style for the dynamic graphic.

5. The method of claim 4, wherein generating the dynamic graphic comprises generating the dynamic graphic having a style corresponding to the visual style identified in the first request.

6. The method of claim 5, wherein the first request further comprises data identifying a set of colors for the dynamic graphic.

7. The method of claim 6, wherein generating the dynamic graphic comprises generating the dynamic graphic in the set of colors identified in the first request.

8. A method for creating a dynamic graphic via a world wide web (Web) interface, the method comprising:
provides by way of a Web browser a user interface for specifying a list of text items for the dynamic graphic and a layout type for the dynamic graphic, each text item comprising one or more characters;
receiving a first request at the Web browser to generate the dynamic graphic, the first request including order information for a plurality of shape elements of a presentation document;
in response to receiving the first request to generate the dynamic graphic, transmitting a first message for the dynamic graphic to a Web service, the message for the dynamic graphic comprising the list of text items and data identifying a layout type for the dynamic graphic, the layout type including shape elements, wherein each shape element includes a textual element that corresponds to a text item of the list of text items, wherein a first shape element includes a first textual element corresponding to a first text item, wherein the order information of the list of text items defines a relationship between the plurality of shape elements in the layout type, wherein the layout type is one of a plurality of layout types, and wherein at least two layout types of the plurality of layout types differently define the positioning of the plurality of shape elements for the dynamic graphic;
receiving from the Web service the dynamic graphic;
displaying the received dynamic graphic by way of the Web browser;
receiving a second request at the Web browser to change shape elements, wherein the second request indicates a second layout type that includes a different shape element that includes the first textual element corresponding to the first text item, wherein the order information of the plurality of text items also defines the relationship between the plurality of shape elements in the second layout type;
in response to receiving the second request, transmitting the second request as a second message to the Web service;
receiving from the Web service a modified dynamic graphic, wherein the modified dynamic graphic comprises a change in the order of shape elements according to the second layout type; and
displaying the modified dynamic graphic.

9. The method of claim 8, further comprising:
determining whether a property of the dynamic graphic has been modified;
in response to determining that a property of the dynamic graphic has been modified, transmitting a third message for the dynamic graphic to the Web service, the third message for the dynamic graphic comprising the modified property;
receiving from the Web service a modified dynamic graphic; and
displaying the modified dynamic graphic by way of the Web browser.

10. The method of claim 8, further comprising:
determining whether the text items have been modified;
in response to determining that the text items have been modified, transmitting a third message for the dynamic graphic to the Web service, the third message for the dynamic graphic comprising a modified list of text items;
receiving from the Web service a modified dynamic graphic; and
displaying the modified dynamic graphic by way of the Web browser.

11. The method of claim 8, further comprising:
determining whether the layout type has been modified;
in response to determining that the layout type has been modified, transmitting a third message for the dynamic graphic to the Web service, the third message for the dynamic graphic comprising data identifying a modified layout type for the dynamic graphic;
receiving from the Web service a modified dynamic graphic; and
displaying the modified dynamic graphic by way of the Web browser.

12. The method of claim 8, further comprising providing within the Web browser a user interface for specifying a style for the dynamic graphic, and wherein the first request for the dynamic graphic transmitted to the Web service further comprises data identifying the style.

13. The method of claim 12, further comprising:
determining whether the style for the dynamic graphic has been modified;
in response to determining that the style has been modified, transmitting a third message for the dynamic graphic to the Web service, the third message for the dynamic graphic comprising data identifying a modified style for the dynamic graphic;
receiving from the Web service a modified dynamic graphic; and
displaying the modified dynamic graphic by way of the Web browser.

14. The method of claim 8, further comprising providing within the Web browser a user interface for specifying a color for the dynamic graphic, and wherein the first request for the dynamic graphic transmitted to the Web service further comprises data identifying the color.

15. The method of claim 14, further comprising:
  determining whether the color for the dynamic graphic has been modified;
  in response to determining that the color has been modified, transmitting a third message for the dynamic graphic to the Web service, the third message for the dynamic graphic comprising data identifying a modified color for the dynamic graphic;
  receiving from the Web service a modified dynamic graphic; and
  displaying the modified dynamic graphic by way of the Web browser.

16. A computer storage memory device having computer executable instructions stored thereon which, when executed by a computer, cause the computer to:
  expose a world wide web (Web) service for generating a dynamic graphic based upon one or more supplied parameters;
  receive at the Web service a first request for a dynamic graphic, the first request supplying the parameters, the parameters including order information for a plurality of elements of a presentation document, the parameters corresponding to an order of text items, wherein each text item corresponds to a shape element of a plurality of shape elements, wherein the plurality of shape elements are arranged according to a first layout, wherein the first layout is one of a plurality of layouts, and wherein at least two layouts of the plurality of layouts differently define the positioning of the plurality of shape elements for the dynamic graphic;
  generate a dynamic graphic based upon the parameters in response to the first request, wherein the order information of the plurality of text items defines a relationship between the plurality of shape elements in the first layout;
  return the dynamic graphic as a response to the first request for a dynamic graphic;
  receiving at the Web service a second request to generate a modified dynamic graphic based on an indicator to change at least one of the plurality of shape elements, wherein the modified dynamic graphic includes a second layout of the plurality of shape elements corresponding to at least one different shape element;
  generating the modified dynamic graphic based on the at least one different shape element, wherein the order information of the plurality of text items also defines the relationship between the plurality of shape elements in the second layout, and wherein the modified dynamic graphic includes a second layout of the plurality of shape elements; and
  returning the modified dynamic graphic as a response to the second request.

17. The computer storage memory device of claim 16, wherein the parameters specify a layout type and a list of text items for the dynamic graphic.

18. The computer storage memory device of claim 16, wherein the parameters further specify a style for the dynamic graphic.

19. The computer storage memory device of claim 17, wherein the parameters specify a color for the dynamic graphic.

20. The computer storage memory device of claim 18, wherein the Web service operates in a stateless mode of operation or a stateful mode of operation, wherein when operating in the stateful mode of operation the Web service maintains a state identifying the layout type, list of text items, style, and color for the dynamic graphic.

* * * * *